(12) United States Patent
Callan et al.

(10) Patent No.: US 7,222,884 B2
(45) Date of Patent: May 29, 2007

(54) MUDGUARD FOR A WHEEL OF AN AGRICULTURAL VEHICLE

(75) Inventors: Jim Callan, Grays (GB); Vince Ellis, Corringham (GB); Allan Smee, Maldon (GB)

(73) Assignee: CNH America LLC, New Holland, PA (US)

( * ) Notice: Subject to any disclaimer, the term of this patent is extended or adjusted under 35 U.S.C. 154(b) by 247 days.

(21) Appl. No.: 10/978,608

(22) Filed: Nov. 1, 2004

(65) Prior Publication Data
US 2005/0098999 A1    May 12, 2005

(30) Foreign Application Priority Data
Nov. 6, 2003   (GB)  ................................. 0325880.3

(51) Int. Cl.
| A62D 25/18 | (2006.01) |
| B62D 25/18 | (2006.01) |
| B62D 25/16 | (2006.01) |
| B62B 9/16  | (2006.01) |
| B60R 27/00 | (2006.01) |

(52) U.S. Cl. ...................... 280/848; 280/847; 280/849; 280/851; 280/159; 280/154; 280/160; 296/198

(58) Field of Classification Search ................ 280/851, 280/849, 848, 847, 160, 159, 154; 296/198
See application file for complete search history.

(56) References Cited

U.S. PATENT DOCUMENTS

| 3,486,764 | A | * | 12/1969 | Beyer et al. ................. 280/851 |
| 4,591,178 | A | * | 5/1986 | Mortvedt et al. ........... 280/154 |
| 5,011,217 | A | * | 4/1991 | Simpson et al. ........ 296/203.01 |
| 6,007,102 | A |   | 12/1999 | Helmus |
| 6,234,506 | B1 | * | 5/2001 | Li ............................... 280/280 |

FOREIGN PATENT DOCUMENTS

| GB | 473408 A | 10/1937 |
| GB | 505160 A | 5/1939 |
| GB | 1477628 | 6/1977 |
| GB | 0325880.3 | 11/2003 |

* cited by examiner

Primary Examiner—Christopher P. Ellis
Assistant Examiner—John R. Olszewski
(74) Attorney, Agent, or Firm—Michael G. Harms; John William Stader; Stephen A. Bucchianeri

(57) ABSTRACT

A mudguard for a wheel of an agricultural vehicle comprises two or more radially stacked parts and that are movable relative to one another in the axial direction of the wheel and lockable in different relative axial positions to form a mudguard of adjustable width.

2 Claims, 1 Drawing Sheet

MUDGUARD FOR A WHEEL OF AN AGRICULTURAL VEHICLE

CROSS REFERENCE TO RELATED PATENT APPLICATIONS

Priority is hereby claimed under 35 U.S.C. 119 to Great Britain Patent Application GB 0325880.3, titled "Mudguard for a Wheel of an Agricultural Vehicle", filed Nov. 6, 2003, and having Jim Callan, Vince Ellis, and Allan Smee as inventors.

BACKGROUND OF THE INVENTION

The present invention relates to a mudguard for a wheel of an agricultural vehicle.

It is desirable for the width of a mudguard of an agricultural vehicle, such as a tractor, to be adjustable. One reason for this is that it is possible to use the same tractor with wheels of different widths and the mudguard is needs to be adapted to the width of the wheel. Also during transportation, or to pass through narrow gates, it may be desirable to reduce the width of the mudguards.

It has hitherto been proposed to provide mudguard extensions that can be attached to the edge of a mudguard or removed therefrom to allow the mudguard width to be increased and decreased. GB-1,477,628 shows an example of a mudguard having such extensions. In the latter patent, the mudguard is for a lorry and it is formed with extensions to allow only part of a mudguard to be replaced in the event of it being damaged. Despite these differences, the latter patent does demonstrate the principle that has been used in the past to extend the width of mudguards.

The use of extensions that attach to one another edge to edge has several disadvantages. Aside from the cost implications of manufacturing parts that interlock with one another, a problem is posed by the length of time that it takes to attach and separate the extensions. Also, carrying and aligning the extensions as they are being mounted is a difficult and cumbersome task which often cannot be carried out single handed. A still further problem is presented by the need to be able to store extensions when they are not in use.

The present invention seeks therefore to provide a mudguard that mitigates these disadvantages and enables the width of the mudguard to be adjusted simply to suit the prevailing requirements.

SUMMARY OF THE INVENTION

According to the present invention, there is provided a mudguard for a wheel of an agricultural vehicle comprising two or more radially stacked parts that are movable relative to one another in the axial direction of the wheel and lockable in different relative axial positions to form a mudguard of adjustable width.

In the preferred embodiment of the invention, the mudguard is formed of two parts, of which one is mounted when in use directly on the vehicle body and posts of adjustable length are provided for mounting the second part on the vehicle body.

Of course, it would be alternatively possible for the mudguard to be formed of more than two parts. It would also be alternatively possible to mount a first part on the vehicle body and to support a second part on the first.

The posts of variable length may suitably be formed of a telescopically collapsible tube of which the sections are lockable relative to one another in different positions. To allow for continuous adjustment of the width, it is preferred for the sections to be lockable relative to one another in all relative positions.

To lock the sections of the tube to one another, the end of a section may be formed with axially extending slots to allow the diameter of the end of that section to be increased or decreased to clamp against an adjacent section.

Preferably, the end of an inner section is slotted and expandable to grip the next larger section by means of an internally threaded nut engaged by a tightening bolt passing through the inner section, the nut having a conically tapering outer surface received within the end of the inner section.

It is an important advantage of the adjustable mudguard of the preferred embodiment of the invention that all its parts remain attached to the vehicle and correctly aligned radially with respect to one another in all settings of the width of the mudguard. Therefore, adjusting the width of the mudguard can readily be carried out single-handedly, as it only requires one of the parts to be released, moved to its desired new position and then re-locked. The weight of the part being moved is supported at all times and even when the mudguard is reduced to its minimum width, all the parts of the mudguard remain attached to the vehicle body and it is not necessary to find an alternative place for them to be stored.

DESCRIPTION OF THE DRAWINGS

The invention will now be described further, by way of example, with reference to the accompanying drawings, in which.

DETAILED DESCRIPTION OF THE PREFERRED EMBODIMENTS

Figure 1:
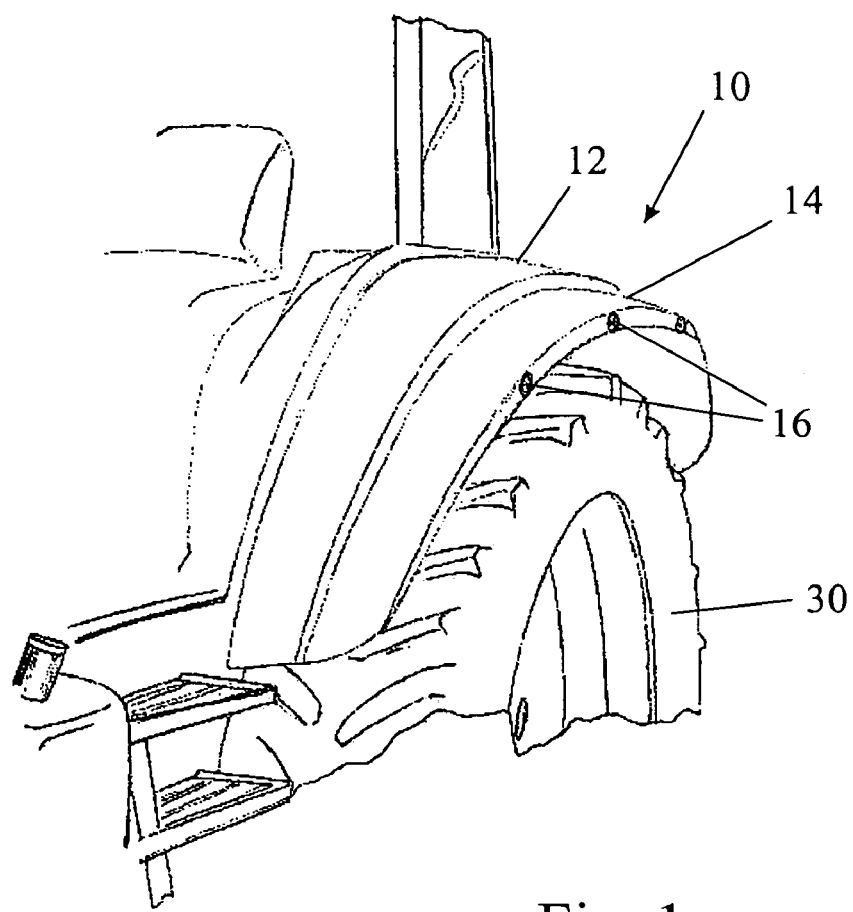
FIG. 1 is a perspective view showing a mudguard of the invention mounted above the rear wheel of a tractor.

The mudguard 10 shown in the drawings comprises a fixed part 12 and an axially adjustable part 14, which is also be referred to as an extension, mounted radially inwards of the fixed part 12. The fixed part 12 is mounted directly on the body of the tractor in a conventional manner and does not move. The extension 14, on the other hand, is mounted on the vehicle body by means of three adjustable posts 20 of which one is shown in section in FIG. 2.

Each of the adjustable posts 20 is constructed as a telescopically collapsible tube having an outer section 22 secured, such as by welding, to the vehicle body and an inner section 24 secured to, and supporting the weight of, the extension 14. The inner end of the inner section 24 has one or more axially extending slots to allow its radius to be expanded. A nut 26 with a conically tapering outer surface is received in the end of the inner section 24 and it engages a bolt 28 passing along the length of the inner section, the head 16 of the bolt 28 being accessible from the side of the vehicle.

The extension 14 is shown in both drawings in an intermediate position in which it has been set to suit the width of the wheel 30. The position of the extension 14 can be adjusted to suit a different wheel or to allow the tractor to be driven through a narrow opening or close to a hedge.

Figure 2:
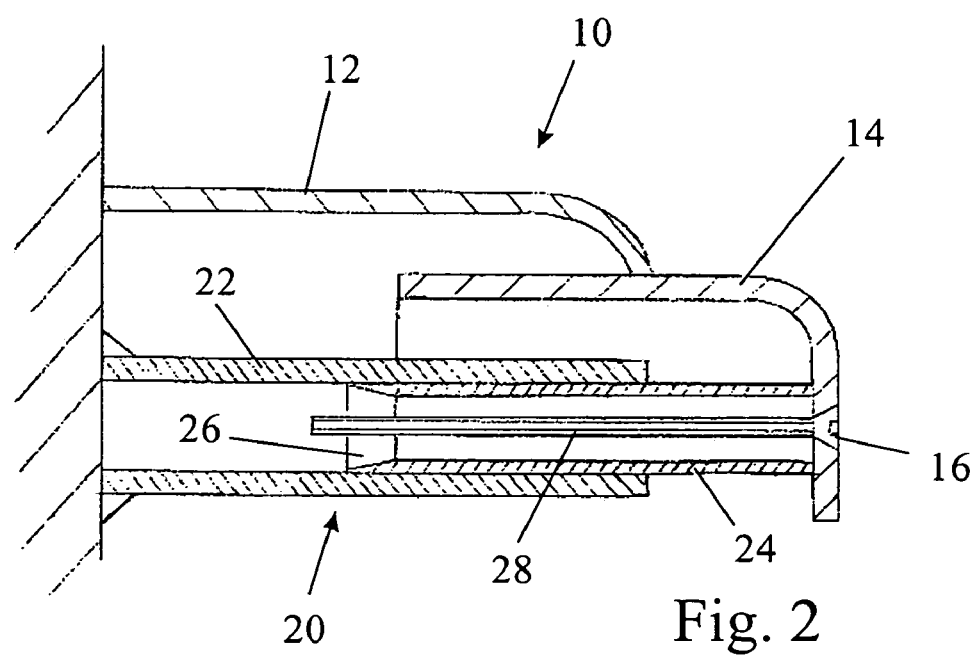
FIG. 2 is a section through the mudguard passing through one of the adjustable mounting posts supporting the radially inner part of the mudguard.

To effect such adjustment, the heads 16 of all the bolts 28 are turned to release the clamping action of the inner section 24 of each mounting post 20 on its outer section. Next, the extension 14 is pulled out or pushed in to increase or decrease the width of the mudguard 10. Hence, if pushed to the left as shown in FIG. 2, the extension 14 will lie entirely beneath the fixed part 12 and the mudguard 10 will only be as wide as the fixed part 12. If pulled further to the right, on the other hand, the extension 14 can be moved to a position where it lies beyond the fixed part 12, thereby increasing the width of the mudguard to the combined width of the two parts 12 and 14. Once the mudguard 10 has been set to desired width between these two limits, the bolts 28 are once again tightened. The interaction of the conical surfaces of the nuts 26 with the inner sections 24 of the posts 20 expands the ends of the inner sections 24 to clamp within the outer sections 22 and thereby lock the extension 14 in the desired new position.

It is an important advantage of the described adjustable mounting posts 20 that mud thrown up by the wheel 30 does not interfere with the locking and releasing of the extension 14. One however may envisage other adjustable brackets for mounting the extension 14 either on the vehicle body or on the fixed part 12 of the mudguard to enable the extension 14 to be moved axially and locked in any position or at least in certain preset positions.

What is hereby claimed, is:

1. A mudguard for a wheel of an agricultural vehicle, comprising:
   a first fender mounted on the vehicle; and
   second fender mounted radially inward of the first fender by at least one post of variable length to allow the second fender to be movable relative to the first fender in the axial direction of the wheel, wherein the at least one post is lockable in different relative axial positions to define a mudguard of adjustable width,
   wherein each of the posts of variable length comprises a telescopically collapsible tube having a plurality of sections, said sections are lockable relative to one another in different positions, wherein the sections of the telescopically collapsible tube are lockable relative to one another in all relative positions, further wherein the end of one section of the telescopically collapsible tube includes axially extending slots to allow the diameter of the end of that section to be increased or decreased to clamp against an adjacent section.

2. A mudguard as claimed in claim 1, wherein the one section of the telescopically collapsible tube includes at least an inner section and an outer section, an end of the inner section being slotted and expandable to grip a next larger section by means of an internally threaded nut engaged by a tightening bolt passing through the inner section, the nut having a conically tapering outer surface received within the end of the inner section.

* * * * *